United States Patent [19]

Dean

[11] Patent Number: 4,645,820

[45] Date of Patent: Feb. 24, 1987

[54] PARTIALLY CRYSTALLINE POLY(SULFONE ESTER) RESIN

[75] Inventor: Barry D. Dean, Broomall, Pa.

[73] Assignee: Atlantic Richfield Company, Los Angeles, Calif.

[21] Appl. No.: 795,039

[22] Filed: Nov. 4, 1985

[51] Int. Cl.[4] ............................................. C08G 75/00
[52] U.S. Cl. ................................... 528/171; 528/176; 528/192
[58] Field of Search ..................... 528/171, 176, 192

[56] References Cited

U.S. PATENT DOCUMENTS

| | | | |
|---|---|---|---|
| 4,137,218 | 1/1979 | Prevursek et al. | 528/126 |
| 4,306,055 | 12/1981 | Baron et al. | 528/171 |
| 4,308,367 | 12/1981 | Green et al. | 525/529 |
| 4,511,706 | 4/1985 | Shalaby et al. | 528/192 |

Primary Examiner—Lucille M. Phynes
Attorney, Agent, or Firm—Dennis M. Kozak

[57] ABSTRACT

Moldable polyester-sulfone thermoplastic resins are prepared by reacting (1) a dihydric phenol, (2) a bis-($\alpha,\alpha$-disubstituted acetic acid) sulfone or its reactive derivative, and (3) a 4,4'-benzophenone dicarboxylic acid or its reactive derivative. Molded articles prepared from the polyester-sulfone resins of the invention exhibit excellent resistance to heat, impact, UV and chemicals.

16 Claims, No Drawings

PARTIALLY CRYSTALLINE POLY(SULFONE ESTER) RESIN

This invention relates to thermoplastic resins.

More specifically this invention relates to moldable polyester-sulfone thermoplastic resins which incorporate recurring units of 4,4'-benzophenone dicarboxylic acid monomer.

In one of its more specific aspects, the invention pertains to moldable polyester-sulfone thermoplastic resins formed by reacting (1) a dihydric phenol, (2) a bis-($\alpha,\alpha$disubstituted acetic acid) sulfone or a reactive derivative thereof, (3) and 4,4'benzophenone dicarboxylic acid or a reactive derivative thereof, and to molded articles produced therefrom.

A number of polymer compositions have been derived from sulfone diesters and diols. U.S. Pat. No. 999,849 teaches polymer compositions derived from diarylalkylene monosulfone diesters and alpha, omega alkyl diols. U.S. Pat. No. 3,004,955 teaches polymer compositions derived from diarylalkylene disulfone diesters and alpha, omega alkyl diols. U.S. Pat. No. 3,035,024 teaches polymer compositions derived from dialkylene monosulfone diesters and alpha, omega alkyl diols. Specifically, the dialkylene monosulfone diesters comprise two unsubstituted polymethylene ester groups of between 2 to 10 carbon atoms chemically bonded to the sulfonemodified polyethylene terephthalate derived from a mixture of an alkyl terephthalate monomer, a dialkylene monosulfone diester monomer and ethylene glycol. In this teaching, the dialkylene monosulfone diester comprises two unsubstituted polymethylene ester groups of between 3 to 5 carbon atoms chemically bonded to the sulfone functionality. Ultraviolet light barrier coatings based on condensation polymers which contain 4,4'-benzophenone dicarboxylic acid or a reactive derivative thereof are taught in U.S. Pat. Nos. 3,492,261 and 3,505,779.

This invention provides novel polyester-sulfone thermoplastic resins which exhibit excellent heat resistance, impact resistance, chemical resistance and UV resistance. The resins of this invention also possess excellent fire retardant characteristics.

According to this invention there is provided a moldable thermoplastic resin comprising the reaction product of about 50 mole % recurring units of a dihydric phenol, from about 30 to about 45 mole % recurring units of a bis($\alpha,\alpha$-disubstituted acetic acid) sulfone or its reactive derivative, and from about 5 to about 20 mole % recurring units of a 4,4'-benzophenone dicarboxylic acid or its reactive derivative, said dihydric phenol having the formula:

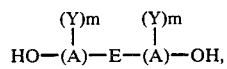

in which each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthalene group m equals 6 and if A is a biphenylene group m equals 8;

said bis($\alpha,\alpha$-disubstituted acetic acid) sulfone or its reactive derivative having the formula:

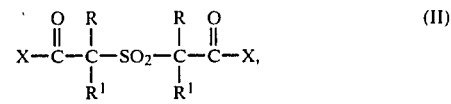

in which each R and $R^1$ separately represent methyl, ethyl or propyl with the proviso that R and $R^1$ on the same carbon atom cannot both be propyl; and in which both X's represent hydroxy, methoxy or chlorine; and said 4,4'-benzophenone dicarboxylic acid or its reactive derivative having the formula:

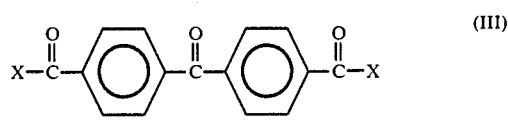

in which both X's represent hydroxy, methoxy or chlorine.

According to this invention there also is provided a method of producing a molded composition which comprises forming the reaction product of from about 50 mole % of a dihydric phenol, from about 30 to about 45 mole % of a bis($\alpha,\alpha$-disubstituted acetic acid) sulfone or a reactive derivative thereof and from about 5 to about 20 mole % of a 4,4'-benzophenone dicarboxylic acid or its reactive derivative, said dihydric phenol having the formula:

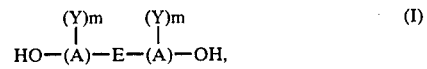

in which each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthalene group m equals 6 and if A is a biphenylene group m equals 8;

said bis($\alpha,\alpha$-disubstituted acetic acid) sulfone or its reactive derivative having the formula:

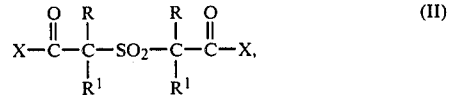

in which each R and $R^1$ separately represent methyl, ethyl or propyl with the proviso that R and $R^1$ on the same carbon atom cannot both be propyl; and in which both X's represent hydroxy, methoxy or chlorine; and said 4,4'-benzophenone dicarboxylic acid or its reactive derivative having the formula:

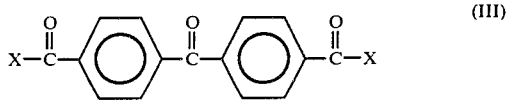

in which both X's represent hydroxy, methoxy or chlorine.

Also, according to this invention there is provided a molded thermoplastic article existing as a single phase in which said single phase is comprised of the reaction product of from about 50 mole % of a dihydric phenol, from about 30 to about 45 mole % of a bis($\alpha,\alpha$-disubstituted acetic acid) sulfone or its reactive derivative, and from about 5 to about 20 mole % of a 4,4'-benzophenone dicarboxylic acid or its reactive derivative.

said dihydric phenol having the formula:

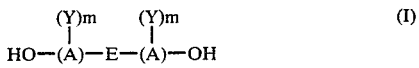

in which each A separately represents a phenylene group, a napthalene group or a biphenylene group; E represents an alkylene group; an alkylidene group; hexafluoroiosopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a napthalene group m equals 6 and if A is a biphenylene group m equals 8;

said bis($\alpha,\alpha$-disubstituted acetic acid) sulfone or its reactive derivative having the formula:

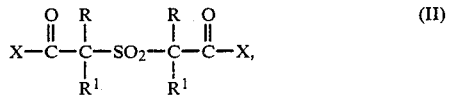

in which each R and $R^1$ separately represent methyl, ethyl or propyl with the proviso that R and $R^1$ on the same carbon atom cannot both be propyl; and in which both X's represent hydroxy, methoxy or chlorine; and said 4,4'-benzophenone dicarboxylic acid or its reactive derivative having the formula:

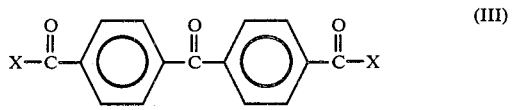

in which both X's represent hydroxy, methoxy or chlorine.

In a preferred embodiment, the moldable thermoplastic resin of this invention will comprise in mole % 50 of a dihydric phenol, 35 to 40 of a bis ($\alpha,\alpha$-disubstituted acetic acid) sulfone units reactive derivative and 10 to 15 of 4,4'-benzophenone dicarboxylic acid or its reactive derivative.

In another preferred embodiment the thermoplastic resin comprises the acid chloride derivative of 4,4'-benzophenone dicarboxylic acid.

The recurring monomer units of 4,4'-benzophenone dicarboxylic acid induce crystallization of the polyestersulfone resins of this invention through the formation of a dimensionally stable semi-crystalline material which in turn serves to enhance the chemical resistance and physical properties of the filled resin as compared to a polyester-sulfone which does not contain the 4,4'-benzophenone dicarboxylic acid.

Illustrative non-limiting examples of dihydric phenols of formula (I) include: 2,2-bis (4-hydroxyphenyl) propane; 2,2-bis (3,5-dimethyl-4-hydroxyphenyl) propane; 2,2-bis (3,5-dibromo-4-hydroxyphenyl) butane, 2,2-bis(4-hydroxyphenyl)hexafluoropropane, 4,4-isopropylidene-4',4'-dihydroxybiphenyl, 4,4-isopropylidene-4',4'-(2',2'-dichlorodihydroxybiphenyl), 2,2'-isopropylidene-6,7'-dihydroxynaphthalene, and the like, and their mixtures. The most preferred dihydric phenol of general formula (I) is 2,2-bis (4-hydroxyphenyl) propane, also known as bisphenol A.

Illustrative non-limiting examples of the bis($\alpha,\alpha$-disubstituted acetic acid) sulfones of formula (II) include: bis($\alpha,\alpha$-dimethyl acetic acid)sulfone; bis($\alpha,\alpha$-dipropyl acetic acid) sulfone; bis($\alpha,\alpha$-ethylpropyl acetic acid) sulfone; bis($\alpha,\alpha$-ethylmethyl acetic acid)sulfone; and the like, and their mixtures.

Illustrative non-limiting examples of the reactive derivatives of bis($\alpha,\alpha$-disubstituted acetic acid) sulfones of formula (II) include: bis($\alpha,\alpha$-dimethyl acetyl chloride)sulfone; bis($\alpha,\alpha$-diethyl acetyl chloride) sulfone; bis($\alpha,\alpha$-methyl propyl acetyl chloride)sulfone; bis($\alpha,\alpha$-ethylpropyl acetyl chloride)sulfone; bis ($\alpha,\alpha$-dimethyl-methylacetate) sulfone; bis($\alpha,\alpha$-diethyl-methylacetate)-sulfone; bis($\alpha,\alpha$-methylpropyl-methylacetate)sulfone; and the like and their mixtures).

Examples of the reactive derivatives of 4,4'-benzophenone dicarboxylic acid are 4,4'-carbonyl bis benzoic acid, 4,4'-carbonyl bis benzoyl chloride and 4,4'-carbonyl bis methyl benzoate.

Syntheses for preparing the bis($\alpha,\alpha$-disubstituted acetic acid) sulfones usable in this invention are known. One suitable synthesis is found in Beilstein Organische Chemie Band III, System No. 223, p. 319, and is incorporated herein by reference.

Methods for preparing the novel polyester-sulfone thermoplastic resins of this invention, include heterogeneous interfacial polymerization, solution condensation polymerization and melt condensation polymerization.

Heterogeneous interfacial polymerization is preferred because interfacial polymerization is suitable for use where the reactants are present in different liquid phases which are immiscible.

If interfacial polymerization is utilized to prepare the novel polyester-sulfone resins of this invention equimolar amounts (understood to mean up to about a 2 mole % excess of one of the reactants) of (1) dihydric phenol and (2) the combined moles of bis($\alpha,\alpha$-disubstituted acetic acid) sulfone plus 4,4'-benzophenone dicarboxylic acid, are used. The dihydric phenol is dissolved in a first solvent medium, the combined bis($\alpha,\alpha$-disubstituted acetic acid) sulfone (e.g. acid chloride form) with the 4,4'-benzophenone dicarboxylic acid (e.g. acid chloride form) is dissolved in a second solvent medium immiscible with the first, and the two solutions are combined. An alkaline aqueous medium (preferably aqueous NaOH or aqueous KOH) serves as the solvent for the dihydric phenol and an organic solvent is utilized for the combined sulfone-benzophenone compounds. The organic solvent selected must also be capable of dissolving or at least swelling the resulting polyester-sulfone resin. Also present during the interfacial polymerization reactions are phase transfer catalysts and molecular weight regulators.

Suitable organic solvents are chlorinated aliphatic solvents (e.g., chloroform, dichloromethane, dichloroethane, trichloroethane and the like, and their mixtures) and chlorinated aromatic solvents (e.g., chlorobenzene). The preferred organic solvent is chloroform.

Suitable phase transfer catalysts are commercially available and include quaternary ammonium compounds and quaternary phosphonium compounds. The preferred phase transfer catalyst is benzyltriethyl ammonium chloride.

The molecular weight regulators serve to control the molecular weight of the polyester-sulfone by a chain stopping or terminating mechanism. Any suitable molecular weight regulator may be used including: phenol, t-butylphenol, o-phenyl phenol and the like, and their mixtures.

The interfacial polymerization reaction proceeds satisfactorily at temperatures within the range of from about 0° to about 40° C., preferably between about 15° to about 35° C. If solution polymerization is utilized the reaction temperatures should also be within the range of from about 0° to about 40° C. With melt phase polymerization the reaction temperatures will be greater than about 250° C. and preferably within the range of from about 250° to about 350° C.

The novel polyester-sulfone thermoplastic resins of the invention can be formed into any desired shape molding, for example, films, sheets, fibers or or molded articles. Specific applications for the polyester-sulfone resins include, but are not limited to, electrical boxes, exterior automotive application, automobile bumpers, and the like. Also, reinforcing fillers in amounts sufficient to impart reinforcement can be incorporated, using conventional methods of incorporation, into the polyestersulfone resin of this invention. Examples of suitable fillers include titanium dioxide, potassium and titanate whiskers, glass flakes, chipped glass fibers, and carbon fibers.

The following examples illustrate the preparation and useful properties of the novel polyester-sulfone thermoplastic resins of the invention. Evaluation of material properties was performed based on the following ASTM standard tests: flexural modulus (D-790), tensile strength (D-638), elongation (D-638), notched Izod (D-256); Limiting Oxygen Index (D-2863), and DTUL (deflection temperature under load, $\frac{1}{8}''$ at 264 psi, (D-648). Gardner falling weight index was established using a $1\frac{1}{4}''$ diameter orifice and an 8 pound $\frac{1}{2}''$ diameter weight. Glass transition temperature was determined by differential scanning colorimetry.

EXAMPLE 1

This example demonstrates the preparation of bis (isobutyryl chloride) sulfone.

Isobutyric acid (175 grams) was dissolved in 700 milliliters of anhydrous tetrahydrofuran (THF). The isobutyric acid/THF solution was cooled to about −15° C. To the isobutyric acid/THF solution was added 1.53 liters of 2.6M n-butyllithium/hexane solution. The temperature of the reaction was maintained between −10° C. to −15° C. during the addition of the alkyllithium reagent. After stirring for about one hour at between −10° to −15°, sulfuryl chloride (134 grams) was added dropwise while maintaining the temperature at −15° C. The lithium dicarboxylate sulfone was recovered by metered addition of 1.4 liters of hexane resulting in precipitation of the lithium dicarboxylate sulfone which was isolated by filtration.

The lithium dicarboxylate sulfone was dissolved in water and acidified to pH=1.0 which resulted in precipitation of a fine white powder. The powder exhibited a melting point of 190°–192° C. Elemental analysis and $^{13}C$ NMR were utilized to confirm the structure:

| Elemental Analysis | Calculated | Found |
|---|---|---|
| % C | 40.33 | 40.25 |
| % H | 5.92 | 5.86 |
| % S | 13.46 | 13.42 |

$^{13}C$ NMR $$HO-\overset{O}{\overset{\|}{C}}-\overset{CH_3}{\underset{CH_3}{\overset{|}{C}}}-SO_2-\overset{CH_3}{\underset{CH_3}{\overset{|}{C}}}-\overset{O}{\overset{\|}{C}}-OH$$

| | |
|---|---|
| $-\underline{C}H_3$ | 23.1 |
| $HO-\overset{O}{\overset{\|}{C}}-\underset{|}{\overset{|}{\underline{C}}}-SO_2$ | 49.8 |
| $-\overset{O}{\overset{\|}{\underline{C}}}-OH$ | 174.6 |

The dicarboxylic acid sulfone (165 grams) was dissolved in 650 milliliters of dry chloroform. The chloroform/dicarboxylic acid sulfone solution was treated with thionyl cholride (165 grams) at 35° C. for five hours. The residual thionyl chloride and the chloroform solvent were removed under vacuum leaving a waxy solid. Infrared analysis confirmed complete conversion of the carboxylic acid functionality to the acid chloride.

EXAMPLE 2

This example demonstrates the preparation of a polyester-sulfone copolymer which does not incorporate recurring units of 4,4'-benzophenone dicarboxylic acid.

A 3-liter flask was charged with 700 milliliters of water, 84.3 grams of sodium hydroxide, 14 grams of sodium hydrosulfite and 158.4 grams of 2,2-bis (4-hydroxyphenyl) propane. The aqueous solution was cooled to 15° C. under a nitrogen blanket.

In a separate 2-liter flask, 190.9 grams of the bis (isobutyryl chloride) sulfone (all R's and R$^1$'s=CH$_3$, X=chlorine, formula II) as prepared in Example 1 were dissolved in 700 milliliters of chloroform along with 0.8 gram of orthophenyl phenol.

The chloroform solution was transferred to a pressure equalizing addition funnel attached to the 3-liter flask containing the alkaline bisphenol A solution. Benzyltriethyl ammonium chloride (0.5 gram) was added to the alkaline bisphenol A solution, the agitation rate was set at 800 rpm. The chloroform solution containing the reactive acid chloride monomer was metered in over a 20 minute period while maintaining the temperature at 15° C. Stirring was maintained at 800 rpm for 1.5 hours with the reaction temperature at 20° to 25° C.

The polymer was analyzed and found to contain 7.5% sulfur content which was consistent with the structure.

The physical properties of the polyester-sulfone were measured on injection molded test specimens and are summarized in Table I which follows Example 4.

EXAMPLE 3

This example demonstrates the preparation of the acid chloride derivative of 4,4′-benzophenone dicarboxylic acid (4,4′-carbonyl bis benzoic acid) suitable for use in the practice of this invention.

A mixture of 100 grams of 4,4′-dimethyl benzophenone, 150 grams chromium trioxide in 1500 ml of acetic acid was treated with 60 ml of acetic anhydride and 10 ml of concentrated sulfuric acid and refluxed for 3.5 hours. Aqueous work up yielded 108.2 g (84%) of crude product. Purification of the crude 4,4′-benzophenone dicarboxylic acid was carried out according to the procedure outlined in U.S. Pat. No. 4,173,708 which procedure is incorporated herein by reference. About 100 grams of the crude 4,4′-benzophenone dicarboxylic acid was treated with a mixture of 100 grams of water and 500 grams of concentrated ammonium hydroxide. Suspended particles were filtered off and the filtrate was added over 1.5 hours to 1200 grams of acetone. The ammonium salt of 4,4′-benzophenone dicarboxylic acid precipitated and was isolated by filtration. The ammonium salt was treated with 1000 grams of water and acidified to a pH of about 3 with dilute hydrochloric acid. The 4,4′-benzophenone dicarboxylic acid precipitated and was filtered. The solid was washed thoroughly with water and, approximately 90 grams of pure 4,4′-benzophenone dicarboxylic acid were recovered.

About 50 grams of 4,4′-benzophenone dicarboxylic acid were treated with 200 grams of thionyl chloride and refluxed for 72 hours. Excess thionyl chloride was distilled off leaving a solid which was the diacid chloride of 4,4′-benzophenone dicarboxylic acid, that is, 4,4′-carbonyl bis benzoic acid.

EXAMPLE 4

This example demonstrates the preparation of a polyester-sulfone of this invention.

A 3-liter resin kettle was equipped with a mechanical stirrer, a nitrogen inlet/outlet and a pressure equalizing addition funnel. The resin kettle was charged with 1000 grams of water, 20 grams of sodium metabisulfite and 110 grams of sodium hydroxide. Once all the sodium hydroxide had dissolved, bisphenol A (100 g, 50 mole %) was added and allowed to dissolve. The resultant aqueous solution was cooled to 16° C. The bis(isobutyryl chloride) sulfone prepared in Example 2 (69.1 grams, 37.5 mole %) and the acid chloride derivative of 4,4′-benzophenone dicarboxylic acid prepared in Example 3 (31.8 g, 12.5 mole %) were dissolved in 300 grams of chloroform and charged to the pressure equalizing addition funnel. About 400 grams of chloroform and 0.2 g of benzyl triethyl ammonium chloride were added to the 3-liter resin kettle. The contents of the addition funnel was added over a twenty minute period while maintaining the temperature between 16° to 23° C. Stirring was maintained at 20°–25° C. for 2.5 hours.

The resultant polymer, a polyester-sulfone of this invention, was isolated by precipitation into methanol using substantially the procedure of Example 2.

The physical properties of the resultant polyestersulfone were measured on injection molded test specimens and are summarized in following Table I and, as the data clearly show, are improved over the physical properties obtained for the polyester-sulfone of Example 2 which does not contain 4,4′-benzophenone dicarboxylic acid.

TABLE I

Comparison of the Polyester-Sulfone Physical Properties

| | Polyester-sulfone of: | |
| --- | --- | --- |
| | Example 2 | Example 4 (Invention) |
| | Mole % | |
| Component | | |
| Bisphenol | 50 | 50 |
| Bis(isobutyryl) chloride) sulfone | 50 | 37.5 |
| Diacid chloride 4,4′-benzophenone dicarboxylic acid | 0 | 12.5 |
| Physical Property: | | |
| Tg (°C., DSC) | 184 | 176 |
| Tm (°C.) | n.d. | 313 |
| Δ Hf (cal/g) | n.d. | 3.7 |
| [3] dl/g[1] | 0.84 | 0.86 |
| Tensile str (psi) | 10,400 | 11,200 |
| Flexural str (psi) | 13,570 | 14,650 |
| Flexural mod (psi) | 362,800 | 371,400 |
| Elongation (%) | 79 | 69 |
| Tensile Impact (ft-lbs/in$^2$) | 326 | 297 |
| Notched Izod (ft-lbs/in) | 8.6 | 6.5 |
| GFWI (in-lbs) | 480+ | 480+ |
| DTUL (⅛″, °F.) | 308 | 297 |
| LOI (%) | 27–28 | 28 |

[1]phenol: sym-tetrachloroethane (60:40) at 30° C.
n.d. — none detectible.

The data of following Table II show the mole % range of 4,4′-benzophenone dicarboxylic acid needed to introduce partial crystallinity into the polyester-sulfone resins according to this invention. The polyester-sulfone resins (A,B,C and D) were prepared according to the procedure of Example 4 with 0, 10, 17.5 and 22.5 mole % 4,4′-benzophenone dicarboxylic acid being incorporated, respectively. The compositions and thermal characterizations upon molding are shown below.

TABLE II

| Polyester Sulfone: | A | B | C | D |
| --- | --- | --- | --- | --- |
| Bisphenol A | 50 | 50 | 50 | 50 |
| Bis(isobutyryl chloride) sulfone (of Example 3) | 50 | 40 | 32.5 | 27.5 |
| Diacid chloride of 4,4′-benzophenone Dicarboxylic acid (of Example 3) | 0 | 10 | 17.5 | 22.5 |
| Tg (°C., DSC) | 184 | 176 | 173 | 180 |
| Tm (°C.) | n.d. | 312 | 319 | n.d. |
| Hf (cal/g) | n.d. | 3.5 | 4.2 | n.d. |
| [3] dl/g[1] | 0.83 | 0.86 | 0.84 | 0.89 |

[1]phenol: sym-tetrachloroethane (60:40 at 30° C.)
n.d. — none detectible

The data of following Table III show the enhanced chemical resistance observed in a polyester sulfone of this invention containing 4,4′-benzophenone dicarboxylic acid (Example 4) as compared to a polyester-sulfone containing no 4,4′-benzophenone dicarboxylic acid (Example 2).

Environmental stress cracking analysis was performed according to ASTM D-1693 with methyl ethyl ketone and ethyl acetate.

TABLE III

ENVIRONMENTAL STRESS CRACKING

| Solvent | Polyether Sulfone of | |
|---|---|---|
| | Example 2 | Example 4 (Invention) |
| | time (sec) to test specimen failure | |
| Methy ethyl ketone | 228 | 610 |
| Ethyl acetate | 320 | 935 |

The data of following Table IV shows the improved UV resistance observed from a polyester-sulfone of the invention containing 4,4′-benzophenone dicarboxylic acid (Example 4) as compared to a polyester sulfone containing no 4,4′-benzophenone dicarboxylic acid (Example 2).

Microtensile bars were subjected to 1000 hours exposure to a Xenon Arc lamp at 50% relative humidity. The tensile impact before and after exposure was measured and a % loss in tensile impact strength determined.

TABLE IV

TENSILE IMPACT STRENGTH

| | Polyether Sulfone of | |
|---|---|---|
| | Example 2 | Example 4 (Invention) |
| | Tensile Impact Strength (ft-lbs/in²) | |
| Before Exposure | 326 | 297 |
| After Exposure | 151 | 215 |
| % Loss in Tensile Impact Strength | 53 | 27 |

EXAMPLE 5

This example demonstrates the improved physical properties of a glass fiber filled, reinforced polyestersulfone resin according to this invention (composition H), containing 4,4′-benzophenone dicarboxylic acid as compared to a polyester-sulfone containing no 4,4′-benzophenone dicarboxylic acid (composition E), a glass fiber, reinforced polyester-sulfone containing no 4,4′-benzophenone dicarboxylic acid (composition F) and a non-glass filled polyestersulfone according to the invention (composition G).

In a Brabender plastograph 44 grams of the polyester-sulfone produced according to the procedure of Example 2 and 44 grams of the polyester-sulfone according to this invention, produced according to the procedure of Example 4 were separately melt compounded with 11 grams of CertainTeed 931 Al ⅛″ glass fibers at 315° C. for 5 minutes at 63 rpm. The data in following Table V show the property values obtained for modulus and glass transition temperature as measured by dynamic mechanical spectrometry according to ASTM-D4065.

TABLE V

| Composition: | E | F | G | H |
|---|---|---|---|---|
| Polyether Sulfone of (Example 2) | 100 | 80 | 0 | 0 |
| Polyether Sulfone of (Example 4) | 0 | 0 | 100 | 80 |

TABLE V-continued

| Composition: | E | F | G | H |
|---|---|---|---|---|
| Glass Fibers | 0 | 20 | 0 | 20 |
| Tg (°C.) | 194 | 209 | 189 | 223 |
| Modulus (psi), 25° C. | 229,800 | 276,310 | 256,290 | 355,930 |

It will be evident from the foregoing that various modifications can be made to this invention. Such, however, are considered as being within the scope of the invention.

What is claimed is:

1. A moldable thermoplastic resin comprising the reaction product of about 50 mole % of a dihydric phenol, with from about 30 to about 45 mole % of recurring units a bis(α,α-disubstituted acetic acid) sulfone or its reactive derivative, and from about 5 to about 20 mole % of a 4,4′-benzophenone dicarboxylic acid or its reactive derivative.

said dihydric phenol having the formula:

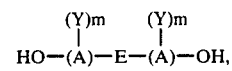

in which each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthalene group m equals 6 and if A is a biphenylene group m equals 8;

said bis(α,α-disubstituted acetic acid) sulfone or its reactive derivative having the formula:

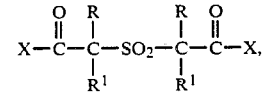

in which each R and R¹ separately represent methyl, ethyl or propyl with the proviso that R and R¹ on the same carbon atom cannot both be propyl and in which both X's represent hydroxy, methoxy or chlorine; and said 4,4′-benzophenone dicarboxylic acid or its reactive derivative having the formula:

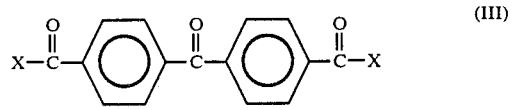

(III)

in which both X's represent hydroxy, methoxy or chlorine.

2. The moldable thermoplastic resin of claim 1 in which said dihyric phenol is 2,2 bis(4-hydroxylphenyl)-propane.

3. The moldable thermoplastic resin of claim 1 in which said 4,4'-benzophenone dicarboxylic acid is 4,4'-carbonyl bis benzoyl chloride.

4. The moldable thermoplastic resin of claim 1 prepared by heterogeneous interfacial polymerization.

5. The moldable thermoplastic resin of claim 1 prepared by solution condensation polymerization.

6. The moldable thermoplastic resin of claim 1 prepared by melt condensation polymerization.

7. The moldable thermoplastic resin of claim 1 in which said reaction product contains from about 35 to about 40 mole % recurring units of a bis($\alpha,\alpha$-disubstituted acetic acid)sulfone or its reactive derivative.

8. The moldable thermoplastic resin of claim 1 in which said reaction product contains from about 10 to about 15 mole % recurring units of 4,4'-benzophenone dicarboxylic acid or its reactive derivative.

9. A method of producing a moldable composition which comprises forming the reaction product about 50 mole % of a dihydric phenol with from about 30 to about 45 mole % of a bis ($\alpha,\alpha$-disubstituted acetic acid) sulfone or its reactive derivative, and from about 5 to about 20 mole % of a 4,4'-benzophenone dicarboxylic acid or its reactive derivative, said dihydric phenol having the formula:

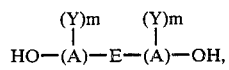

in which each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthalene group m equals 6 and if A is a biphenylene group m equals 8;

said bis($\alpha,\alpha$-disubstituted acetic acid) sulfone or its reactive derivative having the formula:

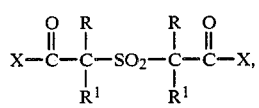

in which each R and $R^1$ separately represent methyl, ethyl or propyl with the proviso that R and $R^1$ on the same carbon atom cannot both be propyl and in which both X's represent hydroxy, methoxy or chlorine; and said 4,4'-benzophenone dicarboxylic acid or its reactive derivative having the formula:

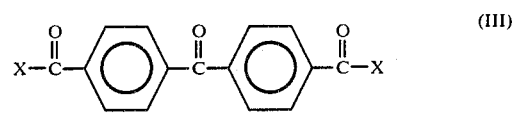

in which both X's represent hydroxy, methoxy or chlorine and molding the resulting reaction product.

10. The method of claim 9 in which said dihydric phenol is 2,2 bis(4-hydroxyphenyl) propane.

11. The method of claim 9 in which said composition is molded in contact with a reinforcing filler.

12. The method of claim 11 in which said filler is glass fibers.

13. The method of claim 9 in which said reaction product is prepared by heterogeneous interfacial polymerization.

14. The method of claim 9 in which said reaction product is prepared by solution condensation polymerization.

15. The method of claim 9 in which said reaction product is prepared by melt condensation polymerization.

16. A molded thermoplastic article existing as a single phase in which said single phase is comprised of the reaction product of from about 50 mole % of a dihydric phenol, from about 30 to about 45 mole % of a bis($\alpha,\alpha$-disubstituted acetic acid) sulfone or its reactive derivative, and a 4,4'-benzophenone dicarboxylic acid or its reactive derivative.

said dihydric phenol having the formula:

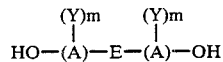

in which each A separately represents a phenylene group, a napthalene group or a biphenylene group; E represents an alkylene group; an alkylidene group; hexafluoroiosopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a napthalene group m equals 6 and if A is a biphenylene group m equals 8; and said bis($\alpha,\alpha$-disubstituted acetic acid) sulfone or its reactive derivative having the formula:

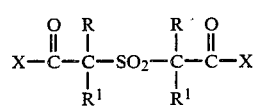

in which each R and $R^1$ separately represent methyl, ethyl or propyl with the proviso that R and $R^1$ on the same carbon atom cannot both be propyl and in which both X's represent hydroxy, methoxy or chlorine.

* * * * *